Sept. 20, 1971 N. J. PETUSKY 3,606,201
CONSTANT SPEED, CONSTANT TENSION TAPE TRANSPORT
Filed July 15, 1969
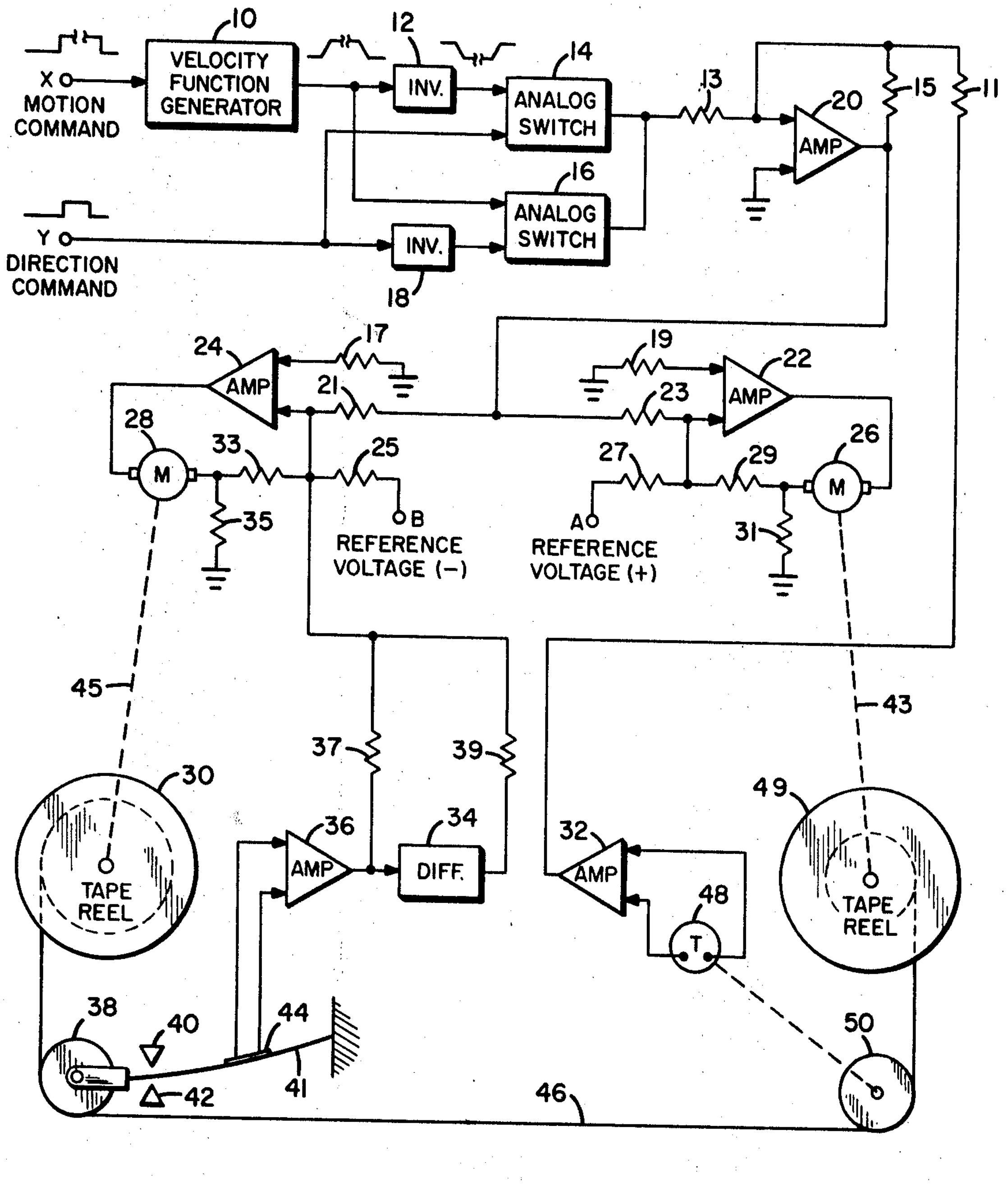
INVENTOR
NEIL J. PETUSKY
BY Rene A. Kuypers
ATTORNEY United States Patent Office 3,606,201

Patented Sept. 20, 1971

3,606,201

CONSTANT SPEED, CONSTANT TENSION TAPE TRANSPORT

Neil J. Petusky, Lafayette Hills, Pa., assignor to Sperry Rand Corporation, New York, N.Y.

Filed July 15, 1969, Ser. No. 841,834
Int. Cl. B65h *59/38, 63/02;* G03b *1/04*
U.S. Cl. 242—190 13 Claims

ABSTRACT OF THE DISCLOSURE

The instant invention relates to a constant speed tape transport system which utilizes a minimum of two motors in the tape drive mechanism and two closed loop servo systems comprising a velocity loop and a tension loop. Both loops are active in both the static and dynamic states of the system. A signal is generated in the tension loop in either state for maintaining approximately equal tension in the tape despite unequal tape radii on the associated tape reels.

BACKGROUND OF THE INVENTION

The invention relates in general to the field of tape transports and particularly relates to a constant speed, constant tension reel-to-reel tape drive transport.

A shortcoming of known prior art tape handling mechanisms has been that they utilize a great number of mechanical components to move the magnetic tape. The tape transport arrangements of the known prior art require clutches, brakes, buffer loops and combinations thereof to provide motion control as well as for tape tension. It is readily apparent that the numerous mechanical components required to supply the above are subject to breakdown and furthermore, increase the cost of such a unit.

SUMMARY OF THE INVENTION

The instant invention is related to a tape transport system which utilizes a minimum of mechanical components by eliminating clutches, brakes, buffer loops, capstan drives and combinations thereof by utilizing just two motors, namely, one motor on the supply reel and one motor on the tape-up reel.

The system also utilizes two servo loops comprising a velocity loop and a tension loop which are utilized in both the static and dynamic states of the system. In the static condition, signals are inserted in both loops which supply approximately the same torque to both the supply and take-up reel. Since the radii of the two reels will in general be unequal the tape tensions will also be unequal. By inserting an additional tension signal into the tape tension servo, the tape tension at the supply reel (for example, can be maintained at a nominal value). The difference between this nominal value of tension at the supply reel and the range of tape tension on the take-up reel will always be less than the static friction of the system. Therefore, there can be no motion under static conditions.

Under dynamic conditions, the velocity error signal associated with tape motion velocity and acceleration is similarly inserted into the tape tension loop. The error signal will not necessarily result in equal shaft velocities and accelerations because the tape radius and inertia on each reel will be constantly changing except for the special case where both reels have the same quantity of tape thereon. To eliminate the problem of tape tension which results from the above-mentioned unequal tape distribution upon the reels, a signal is generated in the tension loop which maintains the tape at constant tension. Therefore, by maintaining a constant tension between the supply and take-up reels, the conventional prior art tape buffer units are eliminated. Furthermore, since the tape motion is controlled directly from the supply reel and the take-up reel, the conventional capstan motor is eliminated.

Therefore, it is an object of this invention to provide a new and improved tape transport device.

It is yet another object of this invention to provide a tape transport device that utilizes only two motors.

It is still another object of this invention to provide a tape transport device which utilizes a minimum of mechanical components but nevertheless maintains constant tape tension under both static and dynamic conditions and further maintains constant speed under dynamic conditions alone.

It is nonetheless another object of this invention to provide a tape transport device which provides improved reliability and economy in cost.

DESCRIPTION OF THE PREFERRED EMBODIMENTS

The tape transport arrangement of the instant invention consists of motion command circuitry and two closed loop servo systems. One of the closed loop servo systems comprises a velocity loop and the other comprises a tension loop. The motion command circuitry comprises a velocity function generator 10, the analog inverter 12, the analog switches 14 and 16, and the logic inverter 18. An analog inverter 12 is merely an inverting amplifier having a unity gain and wherein only a single signal (e.g., a positive signal) is inverted. On the other hand, the logic inverter 18 inverts any one of two input states to the remaining state. For example, if the two input states are positive and ground, the inverter 18 will change the ground input signal to a positive signal and will change the positive input signal to ground potential. For simplicity purposes and ease of description, the velocity function generator 10 is shown in its most elementary form having but a single logic input signal and a single analog response to this input in the form of a trapezoidal waveform with equal rise and fall times.

The velocity servo loop comprises the amplifiers 20, 22 and 32, the D.C. reel motor 26, the tachometer 48, a tape reel 49 and the capstan 50. The amplifier 20 is of the class known as operational amplifiers and of the type known as summing amplifiers. The summing circuit gives an inverted output which is equal to the weighted algebraic sum of the two input signals which are applied via resistors 11 and 13. The gain of the circuit for any input is equal to the ratio of the feedback resistor 15 to the appropriate input resistor. The amplifier 22 in combination with resistors 23, 27, 29 and 31 is a power amplifier which converts a voltage input signal into a proportional output current. The resistor 19 is used for balancing purposes when the amplifier is in the quiescent state. In addition, amplifier 22 serves as a summing amplifier. The amplifier 24 in combination with resistors 21, 25, 33, 35, 37 and 39 is also a power amplifier which converts a voltage input signal into a proportional output current and operates in the same manner as amplifier 22.

The tension servo loop comprises the amplifiers 24 and 36, the D.C. reel motor 28, the tape reel 30, differentiator 34, the idler pulley 38, the spring 41 and the strain gauge sensor 44. The resistors 37 and 39 also form part of the closed loop coupling network.

The operation of the tape transport circuit is as follows. Let us assume that the tape including the tape reels 30 and 49 is in a static condition. No motion signal therefore is present at the input terminals X and Y. Reference voltages however are applied to the terminals A and B. For discussion purposes, the reference voltage applied to terminal A will be positive and the reference voltage applied to terminal B will be negative. The positive voltage applied to terminal A is fed to the input of the power amplifier 22 via the resistor 27. The reference voltage is converted by the amplifier 22 to a proportional current signal and thereafter is directed through the armature of the reel motor 26 and thence through resistor 31 to ground. This current though the amature of the motor 26 will cause the motor shaft 43 to develop a torque which will attempt to rotate the shaft in a counter-clockwise direction.

The negative voltage is supplied to the input terminal of the power amplifier 24 via the resistance 25. This reference voltage is converted to a proportional current by the power amplifier 24 before being directed through the armature terminals of the reel motor 28 to ground via the resistor 35. Since the reference voltage applied to terminal B is of a negative polarity, the current direction generated by this voltage through the armature of the motor 28 will cause the shaft 45 to attempt to rotate the tape reel 30 in a clockwise direction. In other words, by means of the reference voltages applied to terminals A and B the respective reel motors 26 and 28 attempt to rotate their corresponding tape reels in opposite directions thus keeping the magnetic tape 46 in tension. However it should be noted that under static conditions wherein there is no tape motion, both tape reels will have equal magnitude torques but will not have the same magnitude of tension since the tape wrap radii (as shown by the dotted lines on the tape reel) are likely to be unequal. In the example shown on the drawing, the tape tension in reel 49 is greater than in reel 30. In other words, tension (a force) equals torque divided by tape radius and the radius is smaller on reel 30.

As will be explained hereinafter, the tape tension at reel 30 will be constant due to the action of the tape tension servo. The magnitude of this tension is set to the average value of the possible variation of tape tension on tape reel 49 due to the effects of changing radius. Friction in the tape path is designed to be greater than the maximum possible difference between the two tape reels. Hence, no motion is possible under static conditions.

The tape tension servo utilizes a strain gauge item 44 as one leg of a resistive bridge network (not shown) which is the input to amplifier 36. The bridge is designed such that when the tape tension at the tension idler 38 is equal to the average value of tension at tape reel 49, as discussed in the preceding paragraph, the bridge will be balanced. This means that the output of amplifier 36 will be zero which, in turn, means that the strain gauge sensor is not supplying any torque signal to tape reel 30 via motor 28 and amplifier 24.

Assume that tape reel 30 has a tape tension greater than the average tape tension due to the effect of the D.C. reference voltage. (This implies that the tape radius on reel 30 is less than the average value of the tape radius.) Then the idler pulley 38 will be displaced in an upward direction from its normal position. Accordingly, the spring 41 is flexed in a direction which follows the upward displacement of the pulley 38. This causes the strain gauge sensor 44 to generate a signal which indicates the increased tension in tape reel 30. The signal generated by the sensor 44 is fed to amplifier 36 and in turn to the power amplifier 24 via the resistor 37. This signal, which is a tension signal and a D.C. level in character, is combined with the reference voltage applied to terminal B. It should be noted that the D.C. signal from the amplifier 36 does not pass through differentiator 34 since it is blocked thereby. Since the reference voltage applied to terminal B was negative, the voltage generated at the amplifier 36 output by the strain gauge 44 is opposite in polarity or positive. The result is that less current is directed into the armature of motor 28 and hence less rotational force is applied to the motor shaft 45. Therefore, the torque applied to the reel 30 is made approximately equal to the average value of tape tension.

By way of example, let us assume that the tape tension at reel 30 due to the negative reference voltage is 10 ounces whereas the tape tension at reel 49 due to the positive reference voltage is 6 ounces. The nominal or average value of tension is 8 ounces. The average value is the value of tension at the idler 38 as previously discussed. Therefore, the idler 38 will sense the difference (10–8 ounces) and by means of the signal generated by the gauge 44, the tension at reel 30 is reduced to 8 ounces. Accordingly, even though the tension at reel 30 is 8 ounces and the tension at reel 49 is 6 ounces, there is no tape motion since the friction in the tape path is designed to be greater than the maximum possible difference between the two reels.

Assume that tape reel 30 has a tape tension less than the average tape tension. It can be shown by similar reasoning that the tape tension will be approximately equal to the average value of tape tension. Hence, under all static conditions it is apparent that the tape tension at tape reel 30 will be approximately the average value of tape tension developed by the D.C. reference voltage alone.

Let us assume that it is required to move the tape in a certain direction. Accordingly, a motion command is applied to terminal X of the velocity function generator 10. The velocity function generator 10 is shown in its most elementary form wherein a single square input signal is applied and an analog response to this input signal is developed in the form of a trapezoidal voltage waveform with equal rise and fall times. The rise and fall time of the output signal from the velocity function generator represents the rate of change of velocity or acceleration whereas the flat portion represents no acceleration or constant velocity. Hence, the rise and fall time of the output signal of the function generator 10 determines respectively, the acceleration and the deceleration undergone by the motors 26 and 28 in starting and stopping the tape. It should be noted that in the computer art information is recorded on tape in block form. Hence, information is read from or recorded onto a designated block by circuitry (not shown) during the flat portion of the velocity curve where the velocity is constant.

The positive trapezoidal velocity signal is directed both to inverter 12 and to the analog switch 16. The inverter 12 which as discussed above has an amplifier gain of one merely inverts the velocity signal after which it is applied to the analog switch 14. The second input to the respective analog switches 14 and 16 is a logic control signal which allows or inhibits transmission of the analog signal which is the trapezoidal velocity signal. Since the Y direction command is fed directly to analog switch 14 and indirectly via logic inverter 18 to analog switch 16, the two switches will always receive opposite commands such that one switch will allow transmission while the other switch will inhibit transmission. Hence a trapezoidal waveform of either positive or negative polarity will be supplied to resistor 13 depending upon the status of the Y direction command. In the particular embodiment being described, the analog switch 16 is permissed in view of the combination of signals applied thereat. In other words, the positive direction command signal gates the positive velocity signal to the input of the amplifier 20 via the resistor 13 whereas the negative signal is blocked by the analog switch 14.

Amplifier 20 is a high gain amplifier which receives both the velocity input signal above described via the resistor 13 as well as the velocity response signal via resistor 11. The output of amplifier 20 (termed the velocity error signal) is the amplified difference between the velocity command signal and the velocity response signal. The difference signal results when there is no exact correspondence between the trapezoidal velocity signal and the mirror image of the trapezoidal signal (i.e., the velocity response). In other words, an error signal is generated when the acceleration represented by the rise time of the velocity signal and the actual acceleration of the tape reel do not correspond in time and when the deceleration represented by the fall time and the actual deceleration do not correspond.

The error signal is therefore a pulse of a first polarity about a reference voltage (the acceleration error) followed by the constant velocity error (a D.C. voltage with respect to the reference voltage) and followed by a pulse of a second polarity about the reference voltage (the deceleration error). At the instant of time wherein the tape reels 30 and 49 have not as yet begun to move and the motion and direction command signals are applied to terminals X and Y, respectively, the only signal inserted into the closed velocity loop is the velocity signal applied via resistor 13 as there is no response signal applied via resistor 11. As soon as there is movement of the tape, a velocity response signal is generated and the velocity error signal is produced. For the descriptive purposes only, for a left to right movement of the tape 46, the first portion of the error signal will be a positive pulse followed by a positive velocity error and then followed by a negative pulse. It should be understood that for an opposite movement of the tape, the error signal is a negative pulse followed by a negative velocity error and then followed by a positive pulse.

As the reel 49 rapidly accelerates, the error signal is essentially constant and of relatively large magnitude (the positive pulse of the error signal). During acceleration a large force is required which is the reason for the relatively large magnitude of error signal. During the constant velocity portion of the error signal waveform, the only force required is that necessary to overcome friction so that the error signal is reduced to a much smaller magnitude relative to the acceleration error and is of the same polarity. During deceleration, a large force is again required but in the opposite direction to bring the reels to rest. This means that the error signal will again be of large magnitude but of opposite polarity. At the end of all motion, both the motion signal and the error signal will be zero.

Accordingly, when the positive acceleration pulse of the error signal is applied to the power amplifier 22, the latter converts this voltage into a current which is proportional thereto. This current flows through the armature of the D.C. reel motor 26 to ground via the resistor 31. Therefore, the current in the armature in conjunction with the field current therein (not shown) causes the motor to accelerate in the desired counter-clockwise direction. The rotation of the armature including the shaft 43 causes the tape reel 49 to accelerate in unison therewith.

The counter-clockwise rotation of the tape reel 49 causes the capstan 50 to likewise rotate in a counter-clockwise direction. The capstan 50 is connected by a coupling shaft to a tachometer 48. The tachometer 48 senses tape motion and indirectly the reel motion of the tape reel 49. The tape motion is converted to an electrical signal via the tachometer 48. The output of the tachometer 48 is fed into the amplifier 32 via resistor 11. The output of the tachometer 48 is of one polarity when the capstan 48 rotates in one direction and of another polarity when rotated in the second direction. For a counter-clockwise rotation of capstan 50 the polarity of the tachometer 48 output is negative at the output of amplifier 32. The tachometer output is the velocity response signal which closes the velocity servo loop. At all times the tachometer signal at the output of amplifier 32 will be the mirror image of the signal at the input to resistor 13 less the error signal. When no motion exists the error signal will be zero.

As previously mentioned, the velocity error signal from the amplifier 20 is simulaneously applied to the power amplifier 24 via the resistor 21. The amplifier 24 converts the error signal into a proportional current which is directed into the armature of motor 28. This causes the shaft to rotate the reel 30 in the required counter-clockwise direction.

Since the tape reel 49 is accelerating in a counter-clockwise direction the tape reel 30 must likewise accelerate in the same direction. In other words, as reel 49 is winding up tape 46, reel 30 is unwinding the same amount.

It should be noted that the tape radius of each reel will be constantly changing. Hence, the reels will have unequal inertias except for the case where both reels have the same quantity of tape. Therefore, because of these inequalities the positive acceleration pulse of the velocity error signal fed to both servo loops via resistors 21 and 23 will not result in equal tape acceleration. This condition results in loss of tape tension or excessive tape tension. This problem is eliminated as in the case described with respect to the tape under static conditions.

The tape idler 38 senses whether there is an excess or loss of tension in the reel 30. For discussion purposes, reel 30 has a greater tape radius than does reel 49 as depicted in the drawing. Accordingly, the acceleration pulse of the velocity signal applied to the respective amplifiers 22 and 24 will not result in equal tape accelerations since reel 30 has more tape wound thereon than does tape reel 49. In other words, even though equal armature currents flow through reel motors 26 and 28, nevertheless, the tape acceleration at reel 49 will be greater than the tape acceleration at tape reel 30 since the latter reel has a greater inertia.

The above-described condition results in excessive tape tension at tape reel 30. The reason is that since reel 49 has less inertia than reel 30, reel 49 will accelerate more rapidly than reel 30 and hence there will be excessive tension in reel 30. The excessive tape tension in reel 30 is sensed by the idler pulley 38. In the example being discussed, the excessive tension at reel 30 will cause the idler 38 to be displaced upwardly. This causes the spring 41 to be flexed in a direction that indicates this increased tension in reel 30. A signal is produced by the gauge 44 which is directed into amplifier 36. The polarity of the signal is such that at the output of amplifier 36 the signal will be of positive polarity. The output of the amplifier 36 is directed into the input of amplifier 24 via the resistor 37. The signal from the amplifier 36 is of a polarity to reduce the tension at both tape reels to the average tension described in the static condition. Thus, since the first portion of the error signal is positive going, the positive signal from the gauge 44 will be added thereto. Hence, the additional positive signal will generate additional armature current in the reel motor 28 which in turn will apply additional torque in the counter-clockwise direction to the tape reel 30. The negative reference is a signal of small magnitude and will not subtract from the positive signals to any great extent.

After the idler 38 has detected the increase in tension in tape reel 30 and a corresponding correction has been made, the idler 38 and the gauge 44 return approximately to the quiescent position. It should be noted that the positive portion of the error signal is also applied to the differentiator 34. The differential signal is then applied via the resistor 39 to the input of the amplifier 24. The differentiated signal represents the rate of change of tension and is utilized for stability purposes in the closed tension loop. The signal from the gauge 44 and its differentiated form, as well as the velocity error signal and the reference voltage are all summed at the input of the amplifier 24.

After the tape transport system reaches the constant velocity portion of the error signal, a constant velocity is maintained for a predetermined period of time. After the constant velocity portion of error signal is completed, the negative pulse thereof is generated. The negative pulse of the error signal is similarly applied to the power amplifiers 22 and 24 via the respective resistors 23 and 21.

The negative pulse applied to the amplifiers 22 and 24 is converted to a proportional current which is applied to the armatures of motors 26 and 28. The current flows from the ground terminal through the respective armatures via resistors 31 and 35. Therefore, the current through the armatures has been reversed and therefore both motors decelerate to a stop. Under the assumed condition of reel 30 having the greater inertia, the reverse torque applied to the respective reels 30 and 49 does not produce equal decelerations. Therefore, since reel 30 has a greater inertia than reel 49, the reel 30 will not come to as rapid a stop as reel 49. In other words, there will be less tape tension in reel 30 than in reel 49.

Accordingly, the idler pulley 38 will be displaced in a downward direction and the spring 41 will be flexed in such a direction as to generate a negative signal at the output of amplifier 36. This negative signal is applied to the amplifier 24 via resistor 37. The pulse generated by the gauge 44 is also differentiated and applied to the amplifier 24 via the resistor 39. This differentiated signal is utilized for stability purposes and is summed with the tension and negative portion of the error signal as well as the reference voltage at the input of the amplifier.

The negative signal at the output of amplifier 36 is combined with the negative portion of the error signal so that additional negative current flows through the armature of reel motor 28. As a result clockwise torque is applied to reel 30 thereby equalizing the tension in both reels.

The above embodiment has been described with certain polarity signals but it should be understood that the tape transport arrangement functions equally well utilizing opposite polarity signals.

It should be noted that in a particular embodiment, the idler-spring tension sensor has an incremental total displacement since the tension closed loop gain is very large. The tension sensor does not in function perform any significant buffering (i.e., tape storage) between tape reels. Its sole purpose is to maintain constant tape tension at tape reel 30. Furthermore, although the idler-spring-strain gauge tension system is always active in the system (i.e., is operative under static and dynamic conditions) but is considered passive in that it is not driven as are prior art dancer arms. It should also be pointed out that the capstan 50 is also a passive device in that it is also not driven.

The tape tension idler performs a second function. Should a malfunction occur anywhere in the system, loss of tape tension or excessive tape tension would occur. Each of these conditions can result in tape damage. To prevent this, a pair of insulated contacts 40 and 42 are mounted on either side of the tension arm 41. The separation between each contact and the tension arm is such that when tape tension changes by an amount that is more than what is considered normal the tension arm will touch one of the two contacts. The grounding of either of the contacts (not shown) is used to generate a signal which will fail-safe the transport before damage can be done to the tape. This signal will be applied in such a manner that all power will be removed from the system.

The instant invention has been operated at a nominal speed of 16 inches per second but much higher speeds up to over 100 inches per second can be readily attained by using higher speed reel motors.

What is claimed is:

1. In combination, (a) a first reel for winding or unwinding tape;

(b) a motor means coupled to said first reel;

(c) a second reel for winding or unwinding said tape therefrom;

(d) a motor means coupled to said second reel;

(e) means for applying the same signal indicative of the required displacement and direction of the tape to both said first and second motor means for rotating their respective shafts through a desired angle;

(f) means contiguous to said tape for sensing the tension therein and generating a signal therefrom in a manner to indicate whether said first or second reel has the greater inertia, said last-mentioned signal being applied to said first motor means to maintain relatively equal tape tension in both reels.

2. The combination in accordance with claim 1 wherein said means contiguous to said tape comprises an idler pulley connected to a spring and sensor means.

3. The combination in accordance with claim 2 wherein said spring means is deflected against said sensor means.

4. The combination in accordance with claim 3 wherein said sensor means comprises a strain gauge.

5. The combination in accordance with claim 4 wherein the signal generated by said strain gauge is differentiated prior to being applied to said first motor means.

6. The combination in accordance with claim 1 wherein a reference voltage is applied to said first and second motor means for maintaining relatively equal tension on said tape reels in the absence of a displacement signal.

7. The combination in accordance with claim 1 wherein said signal indicative of the required displacement and direction of said tape is applied through two closed loop servo systems comprising a tape velocity loop and a tape tension loop.

8. The combination in accordance with claim 7 wherein said signal indicative of the required tape displacement is generated through a motion command signal and a velocity function generator, whereas the signal indicative of the required direction is generated through a direction command signal.

9. The combination in accordance with claim 7 wherein a tachometer is included in said velocity loop, a comparison being made in said loop between the signal produced by said velocity function generator and said tachometer to produce an error signal.

10. The combination in accordance with claim 7 wherein fail-safe means are included in said closed tension loop for preventing excessive tension from breaking said tape.

11. The combination in accordance with claim 7 wherein said signal indicative of the required displacement is coupled respectively to two analog switches, said switches adapted to receive two signals comprising the output of said velocity function generator and said direction command signal.

12. The method of operating a tape transport device utilizing two tape reels which are mechanically coupled to respective motors and comprising the steps of, (a) generating a velocity error signal to cause the movement of tape from a first to a second tape reel, said error signal being generated by combining a velocity signal and a velocity response signal in a closed loop servo system, (b) generating a tension signal in a closed loop tension servo loop to indicate the tension under both static and dynamic conditions, (c) applying a torque signal to said respective motors under static conditions to maintain tension in said tape about an average value, (d) combining said torque and tension signals under dynamic conditions to cause the movement of said tape in such a manner that its tension is maintained about said average value.

13. The method in accordance with claim 12 wherein the frictional force of the tape path is greater than the difference of tape tension between said two tape reels under static conditions in order to prevent motion.

(References on following page)

References Cited

UNITED STATES PATENTS

| | | | |
|---|---|---|---|
| 3,079,538 | 2/1963 | Yamashita | 318—7 |
| 3,218,529 | 11/1965 | Evans et al. | 318—7 |
| 3,269,670 | 8/1966 | Brian, Jr., et al. | 242—190 |
| 3,318,546 | 5/1967 | Bejach | 242—190 |
| 3,424,392 | 1/1969 | Di Veto et al. | 242—190 |
| 3,507,459 | 4/1970 | Campbell, Jr. | 242—190 |
| 3,458,155 | 7/1969 | Planteijdt | 242—186 |

LEONARD D. CHRISTIAN, Primary Examiner

U.S. Cl. X.R.

318—7